United States Patent
Kupratis et al.

(10) Patent No.: US 10,280,757 B2
(45) Date of Patent: May 7, 2019

(54) GAS TURBINE ENGINE AIRFOIL WITH AUXILIARY FLOW CHANNEL

(71) Applicant: UNITED TECHNOLOGIES CORPORATION, Farmington, CT (US)

(72) Inventors: Daniel Bernard Kupratis, Wallingford, CT (US); Frederick M. Schwarz, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 399 days.

(21) Appl. No.: 15/029,802

(22) PCT Filed: Oct. 7, 2014

(86) PCT No.: PCT/US2014/059394
§ 371 (c)(1),
(2) Date: Apr. 15, 2016

(87) PCT Pub. No.: WO2015/065659
PCT Pub. Date: May 7, 2015

(65) Prior Publication Data
US 2016/0245091 A1    Aug. 25, 2016

Related U.S. Application Data

(60) Provisional application No. 61/897,879, filed on Oct. 31, 2013.

(51) Int. Cl.
F01D 5/14    (2006.01)
F01D 17/16   (2006.01)
(Continued)

(52) U.S. Cl.
CPC .............. *F01D 5/145* (2013.01); *F01D 5/146* (2013.01); *F01D 5/147* (2013.01); *F01D 9/041* (2013.01);
(Continued)

(58) Field of Classification Search
CPC ....... F01D 5/146; F04D 29/682; F04D 29/684
See application file for complete search history.

(56) References Cited

U.S. PATENT DOCUMENTS 3,039,736 A   6/1962   Pon
3,588,269 A   6/1971   Wall
(Continued)

FOREIGN PATENT DOCUMENTS

EP    1878872         1/2008
FR    2438156 A1 *    4/1980   ............. F01D 5/145
(Continued)

OTHER PUBLICATIONS

International Search Report and Written Opinion of the International Searching Authority for International application No. PCT/US2014/059394 dated Jan. 12, 2015.
(Continued)

*Primary Examiner* — Justin D Seabe
*Assistant Examiner* — Juan G Flores
(74) *Attorney, Agent, or Firm* — Carlson, Gaskey & Olds, P.C.

(57) ABSTRACT

A component for a gas turbine engine, according to an exemplary aspect of the present disclosure includes, among other things, an airfoil that includes a pressure side surface and a suction side surface that join together at a leading edge and a trailing edge and a flow channel that extends between the pressure side surface and the suction side surface.

7 Claims, 5 Drawing Sheets

(51) Int. Cl.
  *F01D 9/04* (2006.01)
  *F01D 17/14* (2006.01)
  *F04D 29/68* (2006.01)
  *F04D 29/56* (2006.01)

(52) U.S. Cl.
  CPC ........... *F01D 17/14* (2013.01); *F01D 17/162* (2013.01); *F04D 29/563* (2013.01); *F04D 29/682* (2013.01); *F04D 29/684* (2013.01); *F05D 2220/32* (2013.01); *F05D 2240/123* (2013.01); *F05D 2240/124* (2013.01); *F05D 2240/305* (2013.01); *F05D 2240/306* (2013.01); *F05D 2240/35* (2013.01); *F05D 2260/60* (2013.01); *Y02T 50/673* (2013.01)

(56) References Cited

U.S. PATENT DOCUMENTS

| | | | | |
|---|---|---|---|---|
| 6,203,269 | B1 * | 3/2001 | Lorber | B64C 11/18 244/207 |
| 6,435,815 | B2 * | 8/2002 | Harvey | F01D 5/145 415/115 |
| 7,223,066 | B2 * | 5/2007 | Rockley | F01D 17/162 415/160 |
| 8,007,229 | B2 | 8/2011 | McCaffrey et al. | |
| 8,079,811 | B1 | 12/2011 | Liang | |
| 8,202,043 | B2 | 6/2012 | McCaffrey | |
| 2001/0036401 | A1 | 11/2001 | Harvey et al. | |
| 2008/0273963 | A1 | 11/2008 | Spangler et al. | |
| 2010/0266385 | A1 | 10/2010 | Praisner | |
| 2011/0097205 | A1 | 4/2011 | Maddaus | |
| 2011/0146075 | A1 | 6/2011 | Hazel et al. | |
| 2012/0009065 | A1 | 1/2012 | Harvey et al. | |

FOREIGN PATENT DOCUMENTS

| | | | | |
|---|---|---|---|---|
| FR | 2893993 | | 6/2007 | |
| GB | 736835 | | 9/1955 | |
| GB | 736835 | A * | 9/1955 | ............. F01D 5/145 |
| GB | 826669 | | 1/1960 | |
| WO | 0050779 | | 8/2000 | |

OTHER PUBLICATIONS

International Preliminary Report on Patentability for PCT Application No. PC5/US2014/059394 dated May 12, 2016.
The Extended European Search Report for EP Application No. 14857657.2, dated Jul. 6, 2017.

* cited by examiner

GAS TURBINE ENGINE AIRFOIL WITH AUXILIARY FLOW CHANNEL

BACKGROUND

This disclosure relates to a gas turbine engine, and more particularly to a gas turbine engine airfoil having an auxiliary flow channel for receiving and communicating a portion of core airflow through the airfoil.

Gas turbine engines typically include at least a compressor section, a combustor section, and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section as well as other gas turbine engine loads.

The compressor and turbine sections typically include alternating rows of rotating blades and flow directing vanes. In the turbine section, the rotating blades extract energy from the core airflow that is communicated through the gas turbine engine, while the vanes direct the core airflow to a downstream row of blades.

The vanes can be manufactured to a fixed flow area that is optimized for a single flight point. Alternatively, it is possible to alter the flow area (i.e., cascade channel) between two adjacent vanes by providing one or more variable vanes that rotate about a given axis. Altering the flow area in this manner can expose downstream components to incidence angle variation. For example, rotating the variable vanes may alter the incidence angle at which hot combustion gases impinge upon rotor blades located downstream from the variable vanes, thereby potentially moving the flow stagnation point to a non-optimal location.

SUMMARY

A component for a gas turbine engine, according to an exemplary aspect of the present disclosure includes, among other things, an airfoil that includes a pressure side surface and a suction side surface that join together at a leading edge and a trailing edge and a flow channel that extends between the pressure side surface and the suction side surface.

In a further non-limiting embodiment of the foregoing component, the component is a vane or a blade.

In a further non-limiting embodiment of either of the foregoing components, the component is a mid-turbine frame, an exit guide vane or a fan blade.

In a further non-limiting embodiment of any of the foregoing components, the flow channel includes an inlet at the pressure side surface and an outlet at the suction side surface.

In a further non-limiting embodiment of any of the foregoing components, the flow channel includes a radial dimension that is less than a total span of the airfoil.

In a further non-limiting embodiment of any of the foregoing components, the flow channel includes an outlet positioned upstream from a throat area that extends between the airfoil and an adjacent airfoil.

In a further non-limiting embodiment of any of the foregoing components, the flow channel includes an outlet positioned downstream from a throat area that extends between the airfoil and an adjacent airfoil.

In a further non-limiting embodiment of any of the foregoing components, the flow channel defines a flow passage that extends from a tip toward a root of the airfoil.

In a further non-limiting embodiment of any of the foregoing components, the flow channel defines a flow passage that extends from a root toward a tip of the airfoil.

In a further non-limiting embodiment of any of the foregoing components, the flow channel extends along a curved path.

A gas turbine engine, according to another exemplary aspect of the present disclosure includes, among other things, a variable area section, a variable vane disposed within the variable area section and a blade downstream from the variable vane. At least one of the variable vane and the blade includes a flow channel having an inlet at a pressure side surface and an outlet at a suction side surface of an airfoil of either the variable vane or the blade.

In a further non-limiting embodiment of the foregoing gas turbine engine, the variable area section is a variable area turbine section.

In a further non-limiting embodiment of either of the foregoing gas turbine engines, the variable area section is a variable area compressor section.

In a further non-limiting embodiment of any of the foregoing gas turbine engines, both the variable vane and the blade include the flow channel.

In a further non-limiting embodiment of any of the foregoing gas turbine engines, the flow channel extends in each of a chordwise and a spanwise direction of the airfoil.

A method of operating a gas turbine engine according to another exemplary aspect of the present disclosure includes, among other things, communicating a portion of core airflow through a flow channel that extends between a pressure side surface and a suction side surface of at least one airfoil of the gas turbine engine.

In a further non-limiting embodiment of the foregoing method, the method includes the step of rotating a variable vane prior to the step of communicating.

In a further non-limiting embodiment of either of the foregoing methods, the method includes communicating the portion of airflow into an inlet of the flow channel located along the pressure side surface and expelling the portion of airflow through an outlet of the flow channel located along the suction side surface.

In a further non-limiting embodiment of any of the foregoing methods, the method includes the step of influencing incidence angle variation of a downstream component with the portion of core airflow.

In a further non-limiting embodiment of any of the foregoing methods, the method includes the step of communicating a second portion of core airflow through a flow channel of the downstream component.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure is directed to gas turbine engine components that include auxiliary flow channels. A variable area section of a gas turbine engine may employ one or more airfoils that include a flow channel extending between a pressure side surface and a suction side surface. Core airflow may be communicated through the flow channel to influence a location of the flow stagnation point on the airfoil and downstream components. For example, a portion of core airflow may be communicated through the flow channel in order to modify the incidence angle of the core flow on the airfoil. In another example, a portion of core airflow may be communicated through the flow channel in order to modify the incidence angle at which core airflow impinges on downstream hardware.

Figure 1:
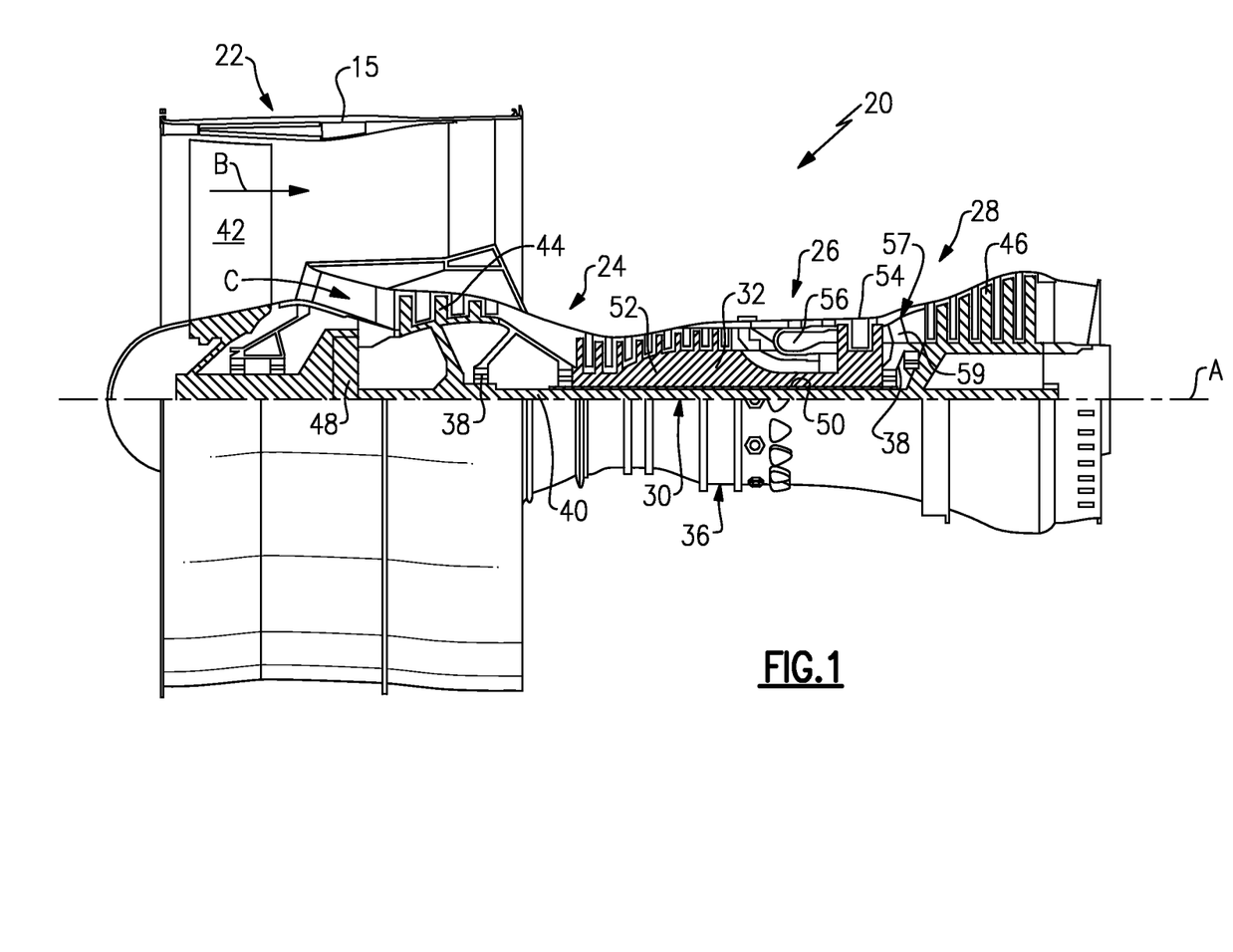
FIG. 1 illustrates a schematic, cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
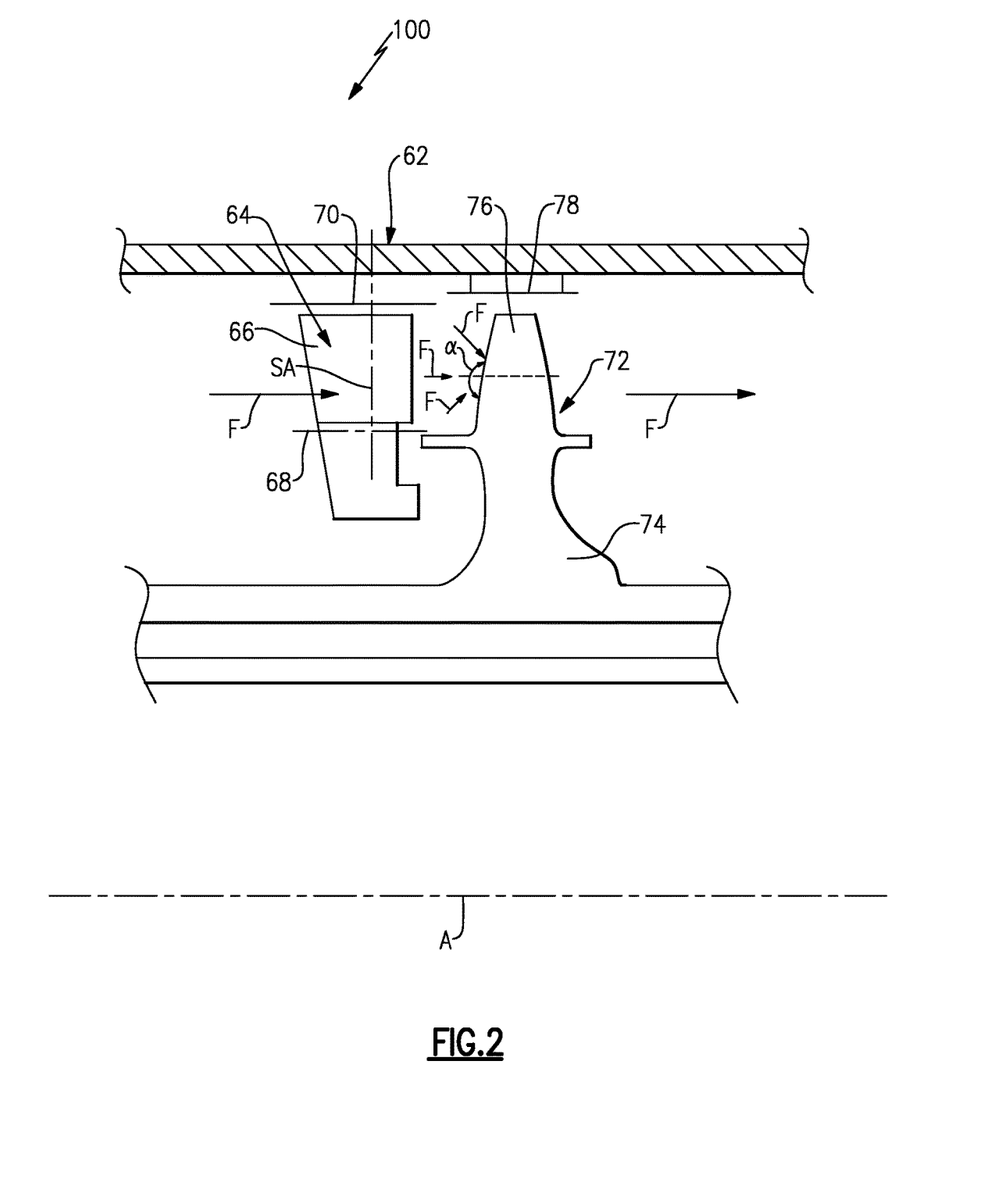
FIG. 2 illustrates a variable area section of a gas turbine engine.

FIG. 2 illustrates a variable area section 100 that may be incorporated into a gas turbine engine, such as the gas turbine engine 20 of FIG. 1. In one embodiment, the variable area section 100 is a variable area turbine section. In another embodiment, the variable area section 100 is a variable area compressor section. The variable area section 100 may make up part of or the entirety of the compressor section 24 and/or the turbine section 28 of the gas turbine engine 20. In other words, these sections could have components in addition to what is shown in FIG. 2.

The variable area section 100 includes one or more stages of alternating rows of vanes and blades. In the illustrated embodiment, the variable area section 100 includes a single stage (i.e., one row of vanes and one row of blades); however, additional stages could be incorporated into the variable area section 100.

A case structure 62 houses the components of the variable area section 100. In one embodiment, the case structure 62 is an outer engine casing that circumscribes the components of the variable area section 100.

In one non-limiting embodiment, the variable area section 100 includes a variable vane assembly 64 having at least one variable vane 66. The variable vane assembly 64 could include an array of variable vanes 66 circumferentially disposed about the engine centerline longitudinal axis A. Alternatively, the variable vane assembly 64 could include a combination of both fixed and variable vanes.

The variable vanes 66 are selectively configurable to change a flow parameter associated with the variable area section 100. For example, each variable vane 66 may be rotated or pivoted (via an actuation system) about a spindle axis SA in order to change the rotational positioning of the variable vane 66. Rotating the variable vane(s) 66 changes the amount of core airflow F that enters the variable area section 100, thereby influencing the flow area of the variable area section 100.

The variable vane(s) 66 is rotatable relative to an inner platform 68 and an outer platform 70 of the variable vane assembly 64. The inner platform 68 and the outer platform 70 may be mounted to the case structure 62 in any known manner.

A rotor assembly 72 is positioned downstream from the variable vane assembly 64. The rotor assembly 72 includes at least one rotor disk 74 that carries one or more rotor blades 76. The rotor blades 76 rotate about the engine central longitudinal axis A to extract energy from the core airflow F, thereby moving the rotor disk 74 and powering various gas turbine engine loads.

The rotor blades 76 rotate relative to blade outer air seals (BOAS) 78 that establish a radially outer flow path boundary for channeling the core airflow F through the variable area section 100. The BOAS 78 may mount to the case structure 62 and extend in relationship to a tip of each rotating blade 76 in order to seal between the blades 76 and the case structure 62.

Altering the flow area associated with the variable area section 100 by moving the variable vane(s) 66 can change the incidence angle α at which core airflow F impinges upon the rotor blades 76 of the downstream rotor assembly 72. Incidence angle variation can negatively influence gas turbine engine efficiency by altering the stagnation point on the airfoil. Accordingly, the variable vanes 66 and/or rotor blades 76 may include airfoils having auxiliary flow channels for addressing such variations. Airfoils of this type are discussed in greater detail below with respect to FIGS. 3-9.

Figure 3:
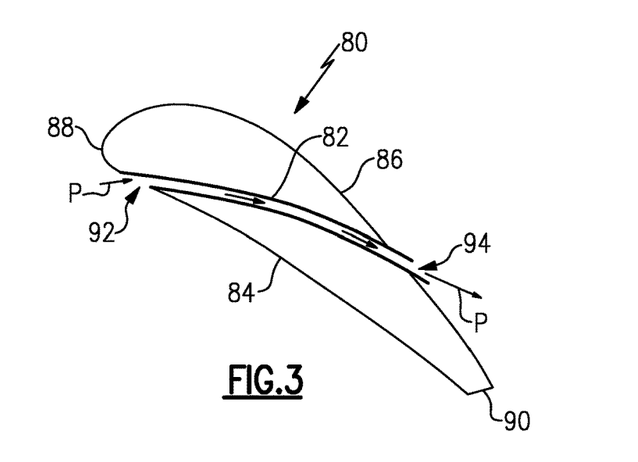
FIG. 3 illustrates an airfoil having a flow channel.

FIG. 3 illustrates a cross-sectional view of an exemplary airfoil 80 that includes a flow channel 82. The airfoil 80 may be part of a vane and/or a blade. For example, the airfoil 80 could be a section of a variable vane 66 of the variable vane assembly 64 and/or a rotor blade 76 of the rotor assembly 72 of FIG. 2 (see, for example, FIGS. 7A, 7B and 8A, 8B). The airfoil 80 could also be part of other gas turbine engine components including but not limited to the mid-turbine frame, a fan exit guide vane or a fan blade.

In one embodiment, the flow channel 82 extends inside of the airfoil 80 between a pressure side surface 84 and a suction side surface 86 of the airfoil 80. The pressure side surface 84 and the suction side surface 86 are spaced apart from one another and generally join together at a leading edge 88 and a trailing edge 90 of the airfoil 80.

In one embodiment, the flow channel 82 includes an inlet 92 located at the pressure side surface 84 and an outlet 94 located at the suction side surface 86. The inlet 92 receives a portion P of core airflow F. The portion P is communicated through the flow channel 82 prior to being expelled from the outlet 94. The inlet 92 and the outlet 94 may be located anywhere on the pressure side surface 84 and the suction side surface 86, respectively.

The flow channel 82 may define any size or shape. In one non-limiting embodiment, the flow channel 82 extends along a curved path. However, the flow channel 82 could follow a linear or non-linear path, a curved path, or any other configuration within the scope of this disclosure. In addition, although shown with a single flow channel, the airfoil 180 could include multiple flow channels.

Figure 4:
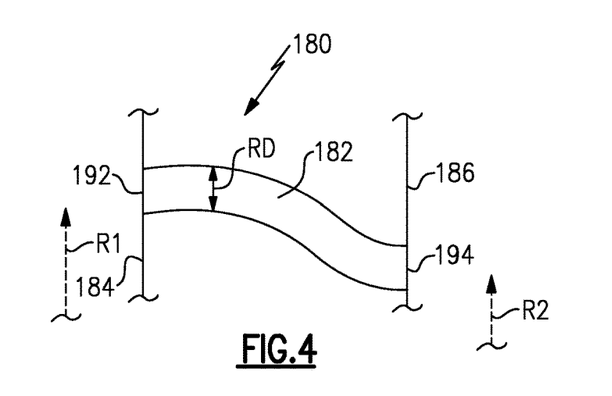
FIG. 4 illustrates another airfoil flow channel.

FIG. 4 illustrates another exemplary flow channel 182 of an airfoil 180. Only a section of the airfoil 180 is illustrated in FIG. 4. In this disclosure, like reference numerals designate like elements where appropriate and reference numerals with the addition of (100) or multiples thereof designate modified elements that are understood to incorporate the same features and benefits of the corresponding original elements.

In this embodiment, the flow channel 182 extends through an interior of the airfoil 180 between a pressure side surface 184 and a suction side surface 186 and includes a radial dimension RD. An inlet 192 of the flow channel 182 may be positioned at a first radial location R1 of the span of the airfoil 180, and an outlet 194 may exit the suction side surface 186 at a second radial location R2 of the span that is different from the first radial location R1. In one non-limiting embodiment, the radial dimension RD of the flow channel 182 includes a span that is generally less than the total span of the airfoil 180.

Figure 5:
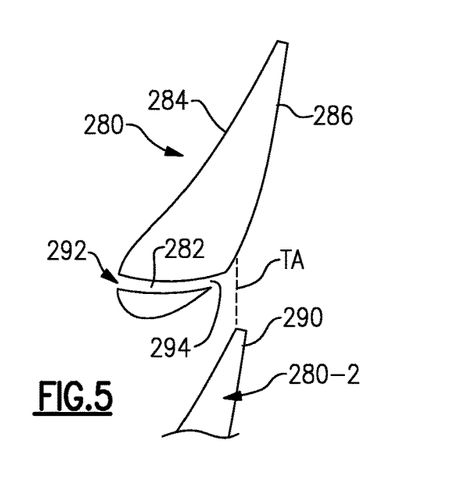
FIG. 5 illustrates another airfoil flow channel.

FIG. 5 illustrates yet another airfoil 280 having a flow channel 282. In one embodiment, an outlet 294 of the flow channel 282 exits the suction side surface 286 at a position that is upstream from a throat area TA that extends between the airfoil 280 and a circumferentially adjacent airfoil 280-2. The throat area TA is a planar opening with a periphery bounded in a radial direction by an outer diameter platform (or casing) and an inner diameter platform and peripherally bounded in the circumferential direction by the suction side surface 286 of the airfoil 280 and a trailing edge 290 of the adjacent airfoil 280-2.

Figure 6:
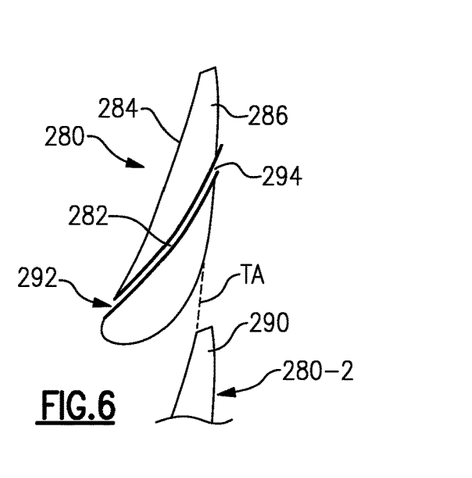
FIG. 6 illustrates yet another airfoil flow channel.

Alternatively, the outlet 294 of the flow channel 282 could exit the suction side surface 286 of the airfoil 280 at a position that is downstream from the throat area TA. This is schematically shown in FIG. 6. It should be understood that the outlet 294 of the flow channel 282 could exit at any location of the suction side surface 286 and that an inlet 292 could be located anywhere along the pressure side surface 284.

Figure 7A:
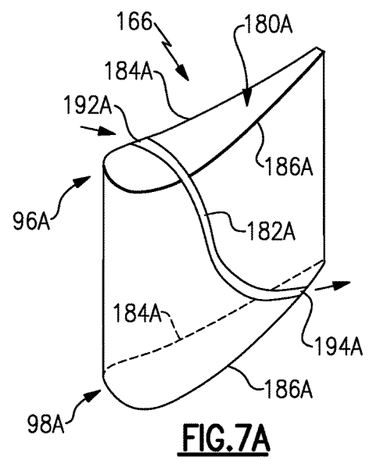
FIGS. 7A and 7B illustrate vanes having flow channels.
Figure 7B:
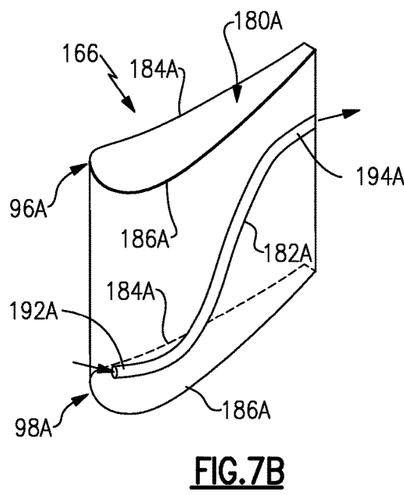

FIGS. 7A and 7B illustrate embodiments of vanes 166 that include flow channels 182A similar to those described above. The vanes 166 include an airfoil 180A having a flow channel 182A that extends between an inlet 192A at a pressure side surface 184A and an outlet 194A at a suction side surface 186A. Referring to FIG. 7A, the flow channel 182A defines a flow passage that extends from a tip 96A to a root 98A of the airfoil 180A. In other words, the flow channel 182A transcends in both chordwise and spanwise directions of the airfoil 180A.

Alternatively, as shown in FIG. 7B, the flow channel 182A could define a flow passage that extends from the root 98A toward the tip 96A of the airfoil 180A. In this embodiment, the inlet 192A is still positioned along the pressure side surface 184A and the outlet 194A still exits at the suction side surface 186A of the airfoil 180A.

Figure 8A:
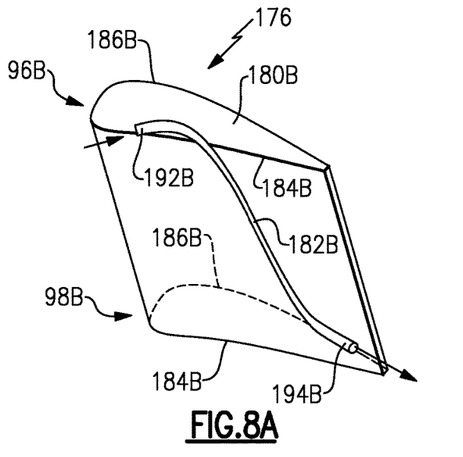
FIGS. 8A and 8B illustrate blades having flow channels.
Figure 8B:
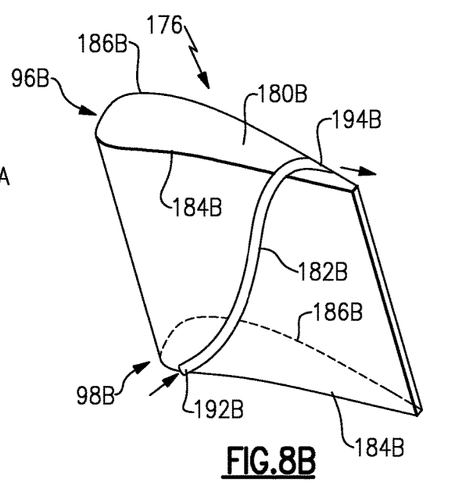

FIGS. 8A and 8B illustrate embodiments of blades 176 that include flow channels 182B similar to those described above. The blades 176 include an airfoil 180B having a flow channel 182B that extends between an inlet 192B at a pressure side surface 184B and an outlet 194B at a suction side surface 186B. Referring to FIG. 8A, the flow channel 182B defines a flow passage that extends from a tip 96B to a root 98B of the airfoil 180B. In other words, the flow channel 182B transcends in both chordwise and spanwise directions of the airfoil 180B.

Alternatively, as shown in FIG. 8B, the flow channel 182B could define a flow passage that extends from the root 98B to the tip 96B of the airfoil 180B. In this embodiment, the inlet 192B is still positioned along the pressure side surface 184B and the outlet 194B exits at the suction side surface 186B of the airfoil 180B.

Figure 9A:
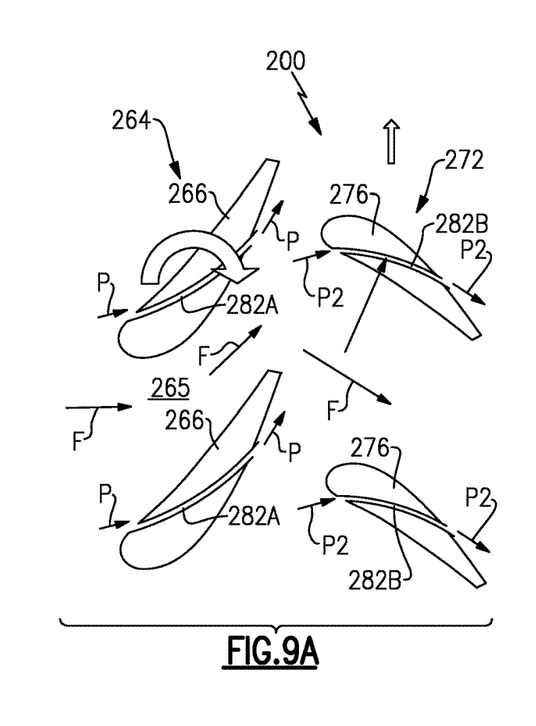
FIGS. 9A, 9B and 9C illustrate multiple configurations of a variable area gas turbine engine section that includes one or more components having flow channels.
Figure 9B:
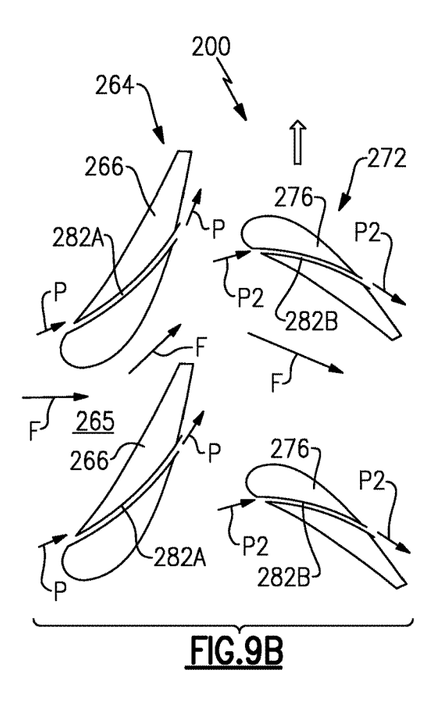
Figure 9C:
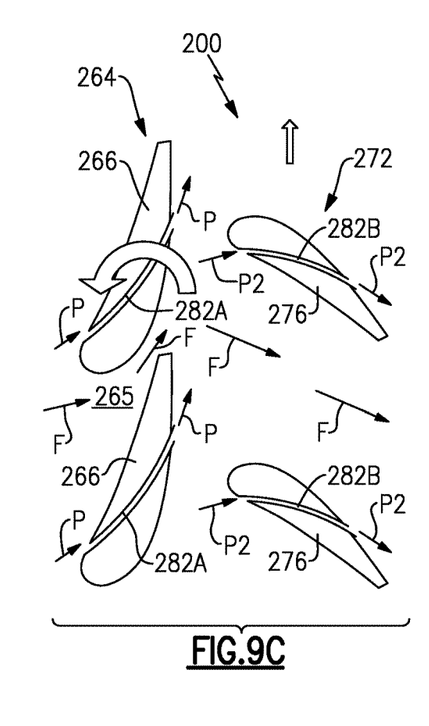

FIGS. 9A, 9B and 9C illustrate multiple configurations of a variable area section 200 having a variable vane assembly 264 and a rotor assembly 272 downstream from the variable vane assembly 264. The variable area section 200 could include additional stages of vane and rotor assemblies within the scope of this disclosure.

The variable vane assembly 264 includes a plurality of variable vanes 266 (two shown) that are rotatable between open (FIG. 9A), nominal (FIG. 9B), and closed (FIG. 9C) positions in order to vary an amount of core airflow F that is communicated through cascade passages 265 that extend between adjacent vanes 266 of the variable vane assembly 264 to impinge upon the downstream rotor assembly 272. The rotor assembly 272 includes a plurality of blades 276 (two shown). The blades 276 rotate about the engine central longitudinal axis A (see FIG. 1) to extract energy from the core airflow F.

In one embodiment, the variable vanes 266 include flow channels 282A and the blades 276 include flow channels 282B. A portion P of the core airflow F may be communicated through the flow channels 282A in order to alter the flow stagnation point of the downstream blades 276. A second portion P2 of the core airflow F may be communicated through the flow channels 282B in order to alter the flow stagnation point on components downstream of the blades 276. In this way, any negative effects caused by incidence angle variation can be substantially ameliorated.

In the same embodiment, the variable vanes 266 include flow channels 282A and the blades 276 include flow channels 282B. A portion P of the core airflow F may be communicated through the flow channels 282A in order to alter the flow stagnation point of the variable vanes 266. A second portion P2 of the core airflow F may be communicated through the flow channels 282B in order to alter the flow stagnation point of the blades 276. In this way, any negative effects caused by incidence angle variation can be substantially ameliorated.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:
a variable area section;
a variable vane disposed within said variable area section;
a blade downstream from said variable vane; and
each of said variable vane and said blade including a flow channel having an inlet at a pressure side surface and an outlet at a suction side surface of an airfoil, each flow channel extending in a curved path in each of a chordwise and spanwise direction, such that a first portion of a core airflow is received in said variable vane flow channel, and a second portion of said core airflow is received in said blade flow channel.

2. The gas turbine engine as recited in claim 1, wherein at least one of said flow channels includes an outlet positioned upstream from a throat area that extends between said airfoil and an adjacent airfoil.

3. The gas turbine engine as recited in claim 1, wherein said variable vane flow channel includes an outlet positioned downstream from a throat area that extends between said airfoil and an adjacent airfoil.

4. A method of operating a gas turbine engine, the method comprising:
communicating a portion of core airflow through a flow channel that extends between a pressure side surface and a suction side surface of at least one airfoil of the gas turbine engine;
communicating the portion of airflow into an inlet of the flow channel located along the pressure side surface;
expelling the portion of airflow through an outlet of the flow channel located along the suction side surface;
influencing incidence angle variation of a downstream component with the portion of core airflow;
communicating a second portion of core airflow through a second flow channel of the downstream component, wherein the second flow channel extends between a downstream component pressure side surface and a downstream component suction side surface;
communicating the second portion of airflow into an inlet of the second flow channel located along the downstream component pressure side surface; and
expelling the second portion of airflow through an outlet of the second flow channel located along the downstream component suction side surface, wherein said flow channel extends along a curved path in each of a chordwise and a spanwise direction of said airfoil, and said second flow channel extends in a curved path in each of a chordwise and a spanwise direction of said downstream component.

5. The method as recited in claim 4, comprising the step of rotating a variable vane prior to the step of communicating.

6. The method as recited in claim 4, wherein said flow channel includes an outlet positioned upstream from a throat area that extends between said airfoil and an adjacent airfoil.

7. The method as recited in claim 4, wherein said flow channel includes an outlet positioned downstream from a throat area that extends between said airfoil and an adjacent airfoil.

\* \* \* \* \*